United States Patent
Nishimura

(10) Patent No.: US 6,956,609 B2
(45) Date of Patent: Oct. 18, 2005

(54) LENS MOVING MECHANISM FOR AN IMAGING DEVICE AND METHOD THEREOF

(75) Inventor: Tomoyuki Nishimura, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 608 days.

(21) Appl. No.: 09/754,394

(22) Filed: Jan. 5, 2001

(65) Prior Publication Data

US 2001/0007472 A1 Jul. 12, 2001

(30) Foreign Application Priority Data

Jan. 11, 2000 (JP) ....................................... 2000-003026

(51) Int. Cl.[7] .............................................. H04N 5/225
(52) U.S. Cl. .................... 348/335; 348/208.11; 396/85; 359/694
(58) Field of Search ................................ 348/335, 345, 348/208.11, 240.2, 357, 240.3; 396/87, 85; 359/694, 696

(56) References Cited

U.S. PATENT DOCUMENTS

| 4,942,417 | A | * | 7/1990 | Miyazawa et al. ............. 396/50 |
| 5,073,790 | A | * | 12/1991 | Ogawa .......................... 396/87 |
| 5,287,137 | A | * | 2/1994 | Hara et al. ..................... 396/87 |
| 5,432,574 | A | * | 7/1995 | Miyazawa et al. ............ 396/349 |
| 5,634,148 | A | * | 5/1997 | Kunishige et al. ............. 396/86 |
| 5,739,962 | A | * | 4/1998 | Asakura et al. ............... 359/700 |
| 5,786,853 | A | * | 7/1998 | Ohkawara et al. ......... 348/240.3 |
| 5,867,217 | A | * | 2/1999 | Okino et al. ............ 348/240.99 |
| 6,097,548 | A | * | 8/2000 | Funahashi et al. ............ 359/694 |
| 6,445,416 | B1 | * | 9/2002 | Kyuma et al. ............ 348/240.3 |

FOREIGN PATENT DOCUMENTS

| JP | 5-41964 | | 6/1993 | ............ G02B/7/10 |
| JP | 05-181050 | * | 7/1993 | ............ G02B/7/08 |
| JP | 7-7143 | | 1/1995 | ............ G02B/7/08 |
| JP | 8-3572 | | 1/1996 | ............ G02B/7/08 |
| JP | 2894659 | * | 3/1999 | ............ G02B/7/08 |

* cited by examiner

*Primary Examiner*—David L. Ometz
*Assistant Examiner*—Gevell Selby
(74) *Attorney, Agent, or Firm*—Sughrue Mion, PLLC

(57) ABSTRACT

A lens moving mechanism for controlling and monitoring movement of an imaging lens, which includes a detection part, a state indication part having arranged in order thereof first, second and third areas, the first area for indicating a first state to the detection part, the second area for indicating a second state to the detection part, and the third area for indicating the first state to the detection part, a drive part for moving the detection part, relative to the state indication part, in a direction thereof, and an identification part for identifying a position of the lens based upon a sequence of indication of the first state and the second state by the state indication part to the detection part.

22 Claims, 8 Drawing Sheets

1

LENS MOVING MECHANISM FOR AN IMAGING DEVICE AND METHOD THEREOF

This patent application claims priority based on a Japanese patent application, 2000-3026 filed on Jan. 11, 2000, the contents of which are incorporated herein by reference.

BACKGROUND OF THE INVENTION

1. Field of the Invention

The present invention relates to a mechanism for moving a lens of an imaging device. More specifically, the present invention relates to a moving mechanism for precisely controlling movement of a lens mirror body and lens thereof of an imaging device.

2. Discussion of the Related Art

A method for identifying the position of a lens of an imaging device when focusing or zooming the lens using a DC motor is disclosed in Post-examined Japanese Patent Publications Nos. Hei 5-41964, Hei 7-7143, and Hei 8-3572.

Recently, it has been necessary to miniaturize imaging devices while keeping the devices inexpensive. Typically, a DC motor is used for zooming and a pulse encoder is used for detecting the position of the lens. An imaging device with a pulse encoder for recognizing the focal length of the lens is disclosed in the Patent Gazette, Japanese Patent No. 2894659.

However, in using the DC motor it is difficult to precisely control movement of the lens. Further, since the pulse encoder can detect only relative positions, it is not possible to accurately measure the actual position of the lens. It is also necessary that the imaging device be further miniaturized and the price of the device be reduced.

The difficulties and limitations suggested in the preceding are not intended to be exhaustive, but rather are among many which demonstrate that the prior art lens moving mechanisms and methods thereof will admit to worthwhile improvement.

SUMMARY OF THE INVENTION

It is a general object of the present invention to provide a moving mechanism, a lens mirror body, and an image device which are capable of solving the above-mentioned problems. The specific objects of the present invention can be attained by combining characteristics recited in the independent claims. Further, the dependent claims thereof define more advantageous embodiments of the present invention.

A first preferred embodiment of the present invention includes a moving mechanism having a detection part that is capable of detecting one of a first state and a second state. A state indication part in which a first area for indicating the first state to the detection part, a second area for indicating the second state to the detection part, and a third area for indicating the first state to the detection part are arranged in the order thereof. A drive part for moving the detection part in a direction of the third area from the first area in a relative manner to the state indication part, when the state indication part indicates the first state to the detection part. An identification part which identifies during a time at which the detection part has moved to a position of a predetermined distance that (a) the detection part has detected the first area before moving to the position of the predetermined distance when the detection part has detected the second state, and (b) the detection part has detected the third area before moving to the position of the predetermined distance when the detection part has not detected the second state. For the drive part, it may be possible to move the state indication part or the detection part in order to move the detection part in a relative manner to the state indication part.

A second preferred embodiment of the present invention includes a moving mechanism having a detection part which is capable of detecting one of a first and a second state. A state indication part in which a first area for indicating the first state to the detection part, a second area for indicating the second state to the detection part, and a third area for indicating the first state to the detection part are arranged in the order thereof. A drive part for moving the detection part in a relative manner to the state indication part, wherein a migration area in which the detection part moves in a normal usage state is within a range of the first area, the second area, and a portion of the third area; a movable area, in which the detection part is movable and the detection part does not move in the normal usage state, is provided outside a migration area of the third area; and the width of the movable area is greater than the width of the first area. For the drive part, it may be possible that the state indication part is moved or the detection part is moved to provide aforesaid relative movement.

Preferably, the detection part includes an identification part for identifying an area to be detected, the drive part moves the detection part in the direction of the third area from the first area in a relative manner to the state indication part, when the state indication part indicates the first state to the detection part, and the identification part, during the time at which the detection part has moved to a position of a predetermined distance, identifies that (a) the detection part has detected the first area before moving to the position of the predetermined distance when the detection part has detected the second state and (b) the detection part has detected the third area before moving to the position of the predetermined distance when the detection part has not detected the second state.

Preferably, the state indication part may include a reflecting part in which reflecting parts having two or more different reflecting ratios are arranged repeatedly in the direction that the detection part moves and may further include a count part for counting the number of times the two or more different reflecting ratios repeat when the detection part moves, and the identification part may recognize the predetermined distance using the number that is counted.

A third preferred embodiment of the present invention includes a lens mirror body which has a moving mechanism capable of moving a lens part in a first, second, and third areas. The lens mirror body includes a drive part for moving the lens; and a state indication part, in which the first area for indicating a first state, the second area for indicating a second state, and the third area for indicating the first state are arranged in the order thereof, for indicating the first state when the lens part is positioned in the first and third areas and for indicating the second state when the lens part is positioned in the second area. A migration area in which the lens part moves in a normal usage state is in a range of the first area, the second area, and a portion of the third area; a movable area where the lens part is capable of moving and the lens part does not move while photographing is provided in the third area; and the width of the movable area is greater than the width of the first area.

A fourth preferred embodiment of the present invention includes an imaging device having a lens part capable of moving. The imaging device includes a detection part which is capable of detecting one of a first and a second state; a state indication part, in which a first area for indicating the first state to the detection part, a second area for indicating the second state to the detection part, and a third area for indicating the first state to the detection part are arranged in the order thereof; and a drive part for moving the detection part in two or more areas among the first, second, and third areas in a relative manner to the state indication part and driving the lens part therewith. For the drive part, it may be possible that the state indication part is moved or the detection part is moved to achieve the aforesaid relative movement.

Preferably, the imaging device may further include an identification part for recognizing a moving direction between a direction of the third area from the first area and a reverse direction thereto when the state changes from the second state to the first state and for identifying an area which the detection part detects based on the result of recognition.

Preferably, the drive part moves the detection part in the direction of the third area from the first area relative to the state indication part, when the state indication part indicates the first state to the detection part, and the identification part, during the time at which the detection part has moved to a position of a predetermined distance by way of a moving mechanism, may identify that (a) the detection part has detected the first area before moving to the position of the predetermined distance when the detection part has detected the second state, and (b) the detection part has detected the third area before moving to the position of the predetermined distance when the detection part has not detected the second state.

Preferably, a migration area in which the lens part moves in a normal usage state is in a range of the first area, the second area, and a portion of the third area; a movable area where the lens part is capable of moving and the lens part does not move while photographing is provided in the third area; and the width of the movable area may be greater than the width of the first area.

A withdrawn position, where the lens part is withdrawn, is located at a boundary position between the first area and the second area or at a vicinity thereof, and a photographing preparation position, where the lens part is positioned for a preparation operation for photographing, may be located in a boundary position between the second area and the third area or at a vicinity thereof.

The state indication part may include a reflecting part in which reflecting parts having two or more different reflecting ratios are arranged repeatedly in the direction that the detection part moves.

Preferably, the state indication part may further include a count part for counting the number of times the two or more different reflecting ratios repeat when the detection part moves. The identification part may recognize the predetermined distance using the number that is counted.

The imaging device may further include a reference value setting part for setting a reference value in the count part in advance, at the time the detection part moves and the detection part changes from the first state to the second state and from the second state to the first state, and for setting the reference value as a number of counts which the count part maintains when a state in which the detection part detects changes.

The detection part returns to a position at which the state changes at a lower speed than a moving speed towards the predetermined direction if the detection part changes from the first state to the second state and from the second state to the first state when the lens part moves in a predetermined direction, and the count part may start to count at the time the detection part returns to the position in which the state changes.

A fifth preferred embodiment of the present invention includes an imaging device having a lens part capable of moving. The imaging device includes: a detection part which is capable of detecting one of a first state and a second state; a state indication part, in which a first area for indicating the first state to the detection part, a second area for indicating the second state to the detection part, and a third area for indicating the first state to the detection part are arranged in the order thereof; and a drive part for moving the detection part between the first area and the third area in a relative manner to the state indication part and driving the lens part therewith. For the drive part, it may be possible that the state indication part is moved or the detection part is moved for the aforesaid relative movement.

A sixth preferred embodiment of the present invention includes a position detection method, wherein a position of a lens part, in a lens mirror body where the lens part is capable of moving, is detected. The method includes a moving stage of moving the lens part in two or more areas among a first area for indicating a first state, a second area for indicating a second state, and a third area for indicating the first state; a detection stage of detecting the first state and the second state simultaneously with the moving stage; and a decision stage, when the second state is changed to the first state in the detection stage, of recognizing a moving direction of the lens between a direction towards the third area from the first area and a reverse direction thereto and of identifying an area which the lens detected prior to the moving stage based on a result of recognition.

It should be noted that all of the advantageous characteristics of the present invention are not described in the foregoing summary of the invention. Further, sub-combinations of the preferred embodiments thereof are also within the scope of the present invention.

BRIEF DESCRIPTION OF THE DRAWINGS

Other objects and advantages of the present invention will become apparent from the following detailed description of preferred embodiments thereof taken in conjunction with the accompanying drawings, wherein:

FIG. 5 is a flowchart of the process of operating a zoom part when the electric power is switched on;

DETAILED DESCRIPTION OF THE INVENTION

Figure 1:
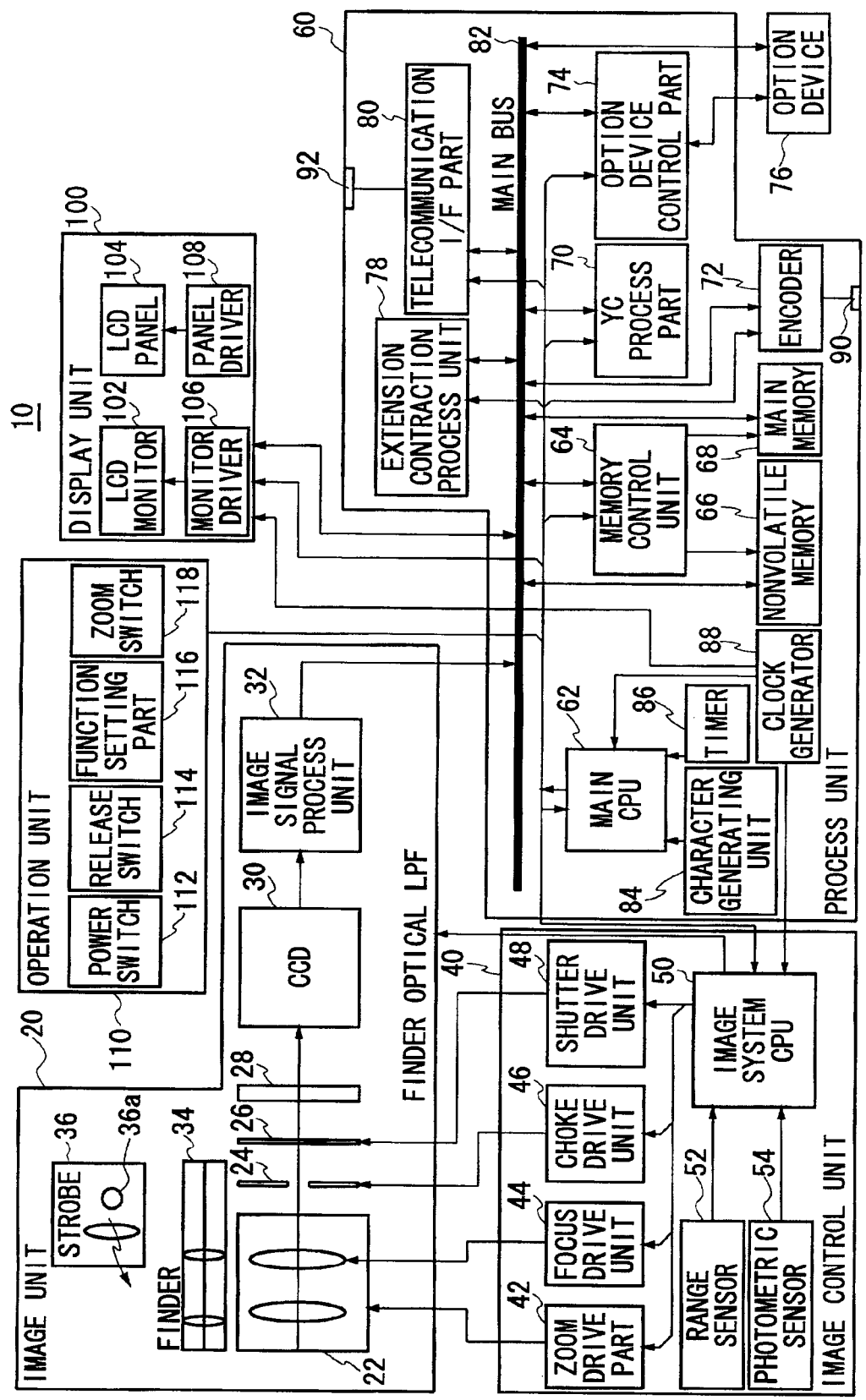
FIG. 1 shows schematically a digital camera having a zooming function.
Figure 2:
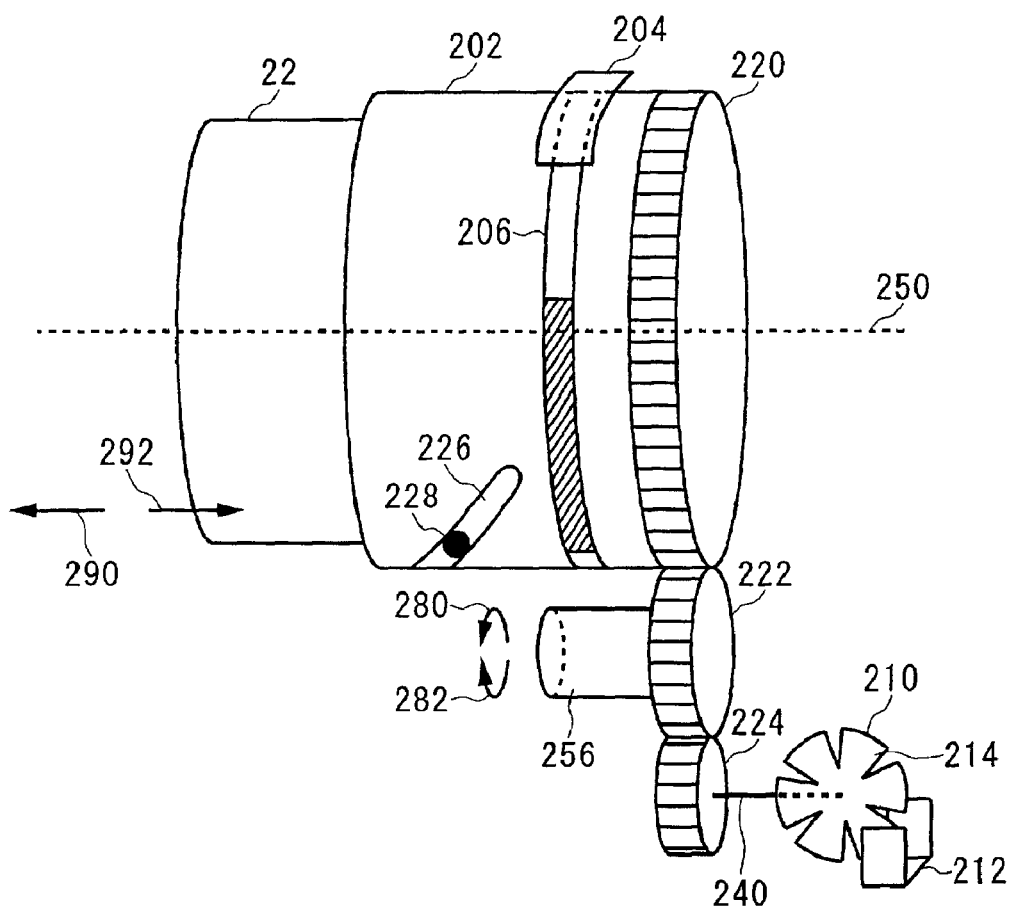
FIG. 2 is a perspective view of an image lens part and members for performing a zooming operation of the image lens part.

FIG. 1 is a block diagram of a digital camera 10 having a zooming function. A zoom drive mechanism in accordance with the present invention is shown in FIG. 2 and subsequent figures thereto. A digital camera 10 includes an image unit 20, an image control unit 40, a process unit 60, a display unit 100, and an operation unit 110.

The image unit 20 includes an electrical member and a mechanical member in relation to an image and an image-formation. The image unit 20 includes an image signal processing unit 32, CCD (charge couple device) 30, an optical LPF (low pass filter) 28, a shutter 26, a choke 24, and a photographing lens part 22 for taking and processing an image. The lens part 22 includes a focus lens, a zoom lens, and so forth. By this configuration, an object image is formed on an input face of CCD 30. Corresponding to the quantity of light of the object image that is formed, an electric charge is accumulated (hereinafter "accumulative charge") on each sensor element (not shown) of CCD 30. The accumulative charge is registered in a shift register (not shown) by way of a read gate pulse, and then outputted sequentially as an electric signal by a register transfer pulse.

Since the digital camera 10, in general, operates with an electric shutter, a mechanical shutter is not required. For the electric shutter, a shutter drain is provided in CCD 30 through a shutter gate. When the shutter gate is driven, the accumulative charge is ejected in the shutter drain. By control of a shutter gate, it is possible to control the period of time or duration, namely the shutter speed, during which the electric charge is accumulated in each sensor element.

An electric signal, namely an analog signal, output from CCD 30, is color-divided into R, G, and B elements by way of the image signal processing unit 32 and, initially, a white balance is adjusted. Subsequently, the image signal processing unit 32 performs a gamma correction. Then R, G, B signals are A/D-converted sequentially in necessary timing, and digital image data (hereinafter "digital image data") that result are output to the process unit 60.

The image unit 20 further includes a finder 34 and a strobe 36. An LCD (not shown) can be included in the finder 34 so that various types of information from a main CPU 62 (described hereinafter) can be displayed in the finder 34. The strobe 36 emits light when energy charged in a condenser (not shown) is supplied to a discharge tube 36a.

The image control unit 40 includes a focus drive unit 44, a choke drive unit 46, a shutter drive unit 48, an image system CPU 50 for controlling them, a range sensor 52, and a photometric sensor 54. A zoom drive part 42 includes a DC motor, a pulse encoder, and a counter (described hereinafter). When a release switch 114 (described hereinafter) is operated, the range sensor 52 measures a distance to an object ("range data") and the photometric sensor 54 measures the brightness of the object ("photometric data") and the respective data are sent to the image system CPU 50. The image system CPU 50 adjusts focusing and a zoom magnification of the lens part 22 by controlling the zoom drive part 42 and the focus drive unit 44 based on photographic information of the zoom magnification and so forth inputted by a user. The zoom drive part 42, in accordance with a preferred embodiment of the invention, is described with reference to FIG. 2 and successive figures thereafter.

The image system CPU 50 sets a shutter speed and a choking value based on an RGB digital signal accumulative value, namely AE information, of one image frame. In accordance with a defined value, the choke drive unit 46 regulates the choking volume and a shutter drive unit 48 switches the shutter 26.

The image system CPU 50 controls a light emission of the strobe 36 based on the photometric data, and the choking volume is adjusted at the same time. When the user calls up a screen image, CCD 30 starts to accumulate the electric charge, and the accumulative electric charge is output to the image signal processing unit 32 after the shutter time, which is calculated from the photometric data, has elapsed.

The process unit 60 includes a whole digital camera 10, especially the main CPU 62 for controlling the process unit 60, a memory control unit 64 being controlled thereby, a YC process part 70, an option unit control part 74, an extension/contraction process unit 78, and a telecommunication I/F part 80. The main CPU 62 transacts necessary information from the image system CPU 50 by way of serial telecommunication and the like. The operating clock of the main CPU 62 is given by a clock generator 88. The clock generator 88 also provides respective different frequency clocks to the image system CPU 50 and a display unit 100.

A character generating unit 84 and a timer 86 are provided, in parallel, in the main CPU 62. The timer 86 is operated by a battery as a backup and records the date/time. Information relating to the date/time of photographing and other information relating to the time are given to the main CPU 62 from this count value. The character generating unit 84 generates character codes of the date/time of the photograph, a title, and so forth, and such character codes are mixed with a photographic image in a suitable manner.

The memory control unit 64 controls a nonvolatile memory 66 and a main memory 68. The nonvolatile memory 66 includes EEPROM (ROM erasable electrically and programmable), a FLASH memory, and so forth, to store data such as set-up information input by the user and other settings input before shipping out the camera 10, which should be maintained even if the electric power of the digital camera 10 is switched off. A boot program of the main CPU 62, a system program, and so forth may be stored in the nonvolatile memory 66. On the other hand, the main memory 68 has a memory, which is relatively low in cost and also has a large capacity, such as DRAM in general. The main memory 68 includes functions such as a frame memory for storing data output from the image unit 20, a system memory for loading various kinds of programs, and a work area, and so forth. The nonvolatile memory 66 and the main memory 68 transact data with respective internal and external parts of the process unit 60 through a main bus 82.

The YC process part 70 performs YC-conversion to a digital image data, and generates a brightness signal Y and color difference (chroma) signals B-Y and R-Y. The brightness signal and the color difference signal are temporarily stored in the main memory 68. The extension/contraction process unit 78 reads out the brightness signal and the color difference signal from the main memory 68 and then compresses the data (hereinafter "compressed data"), which are written in a memory card, a kind of an option device 76, by way of an option device control part 74.

The process unit 60 further includes an encoder 72. The encoder 72 inputs the brightness signal and the color difference signal, and converts them into a video signal (NTSC and a PAL signal) and then outputs the video signal from a video output terminal 90. When the video signal is generated from data recorded in the option device 76, the data thereof are first given to the extension/contraction process unit 78 by way of the option device control part 74. Subsequently, data to which the extension/contraction process is performed in the extension/contraction process unit 78 are converted to the video signal by way of the encoder 72.

The option device control part 74 performs an electrical conversion, a logical conversion, and required signal generation between the main bus 82 and the option device 76, in accordance with the bus specification of the main bus 82 and a symbolic specification acknowledged by the option device 76. The digital camera 10 may support a standard I/O card referencing PCMCIA, for example, in addition to the above-mentioned memory card, as the option device 76. In such a case, the option device control part 74 may be composed of a bus control LSI and the like.

The telecommunication I/F part 80 performs a protocol conversion and the like in accordance with a telecommunication standard, which the digital camera 10 supports, such as the specification of an ethernet, RS-232C, USB, etc., for example. The telecommunication I/F part 80 includes a driver IC as the need arises, and communicates with outside units including a network by way of a connector 92. It is possible for data transaction to be performed by way of an original I/F with a printer, a karaoke device, a game machine, and so forth, in addition to a standard specification.

The display unit 100 includes an LCD monitor 102 and an LCD panel 104 controlled, respectively, by a panel driver 108 and a monitor driver 106. The LCD monitor 102, having a size of more or less 2 inches, for example, and installed on the back face of the camera, displays a present mode of photographing and a playback therefor, a zoom magnification of photographing and the playback therefor, a residual volume of a battery, the date/time, a screen for setting a mode, a target image, and so forth. The LCD panel 104, which is a small monochrome LCD, for example, is installed on an upper face of the camera, and displays information briefly about a picture quality (FINE/NORMAL/BASIC, etc.), a strobe emission/non-emission, the number of standard photographs which can be taken, the number of picture elements, a battery capacity, and so forth.

An operation unit 110 includes an electrical component and a mechanism necessary to indicate or set the operation of the digital camera 10 and the mode thereof. A power switch 112 determines an on-off state of the electric power source of the digital camera 10. The release switch 114 has a pressure system with two operative positions of semi-positive and full-positive. To cite a simple example, AE and AF are locked by the semi-positive position and a photograph image is taken by the full-positive position and recorded in the main memory 68, the option device 76, and so forth after the necessary information processing, data compression, and so forth are performed. The operation unit 110 may accept a setting function by a cross key and a rotatable mode dial, in addition to switches, and a function setting part 116 is a generic name that is given to such parts in FIG. 1. Examples of a function or an operation which the operation unit 110 can provide are "file format," "special effect," "printing," "determination/store," "display switch," and so forth. The zoom switch 118 determines the zoom magnification.

An operation of the above-mentioned components is described hereinafter. First of all, the power switch 112 of the digital camera 10 is switched ON, and then the electric power is supplied to respective parts of the camera. The main CPU 62 determines whether the digital camera 10 is in a photographing mode or a play-back mode by reading the state of the function setting part 116.

When the camera is in the photographing mode, the main CPU 62 monitors for the state of the semi-positive position. When the semi-positive state is detected, the main CPU 62 obtains the photometric data and the range data from the photometric sensor 54 and the range sensor 52, respectively. The image control unit 40 functions based on the obtained data, and adjustments, such as focusing and choking of the photographing lens part 22, are performed. When adjustment is completed, the status thereof is given to the user by displaying characters such as "stand-by" on the LCD monitor 102, and then the full-positive state of the release switch 114 is monitored. When the release switch 114 is in the full-positive state, the shutter 26 is closed after a predetermined shutter time has passed, and then the accumulative electric charge is swept out to the image signal processing unit 32. The digital image data, which are generated as a result of a process by the image signal processing unit 32, are output to the main bus 82. The digital image data are stored in the main memory 68 for the time being, then are processed by the YC process part 70 and the extension/contraction process unit 78 and stored in the option device 76, by way of the option device control part 74. The recorded image is momentarily displayed by the LCD monitor 102 in a frozen state, and the user can recognize the photograph image. Thus, a series of photographing operations terminate.

When the digital camera 10 is in the playback mode, the main CPU 62 reads out the last photograph image from the main memory 68 through the memory control unit 64 and displays the image on the LCD monitor 102 of the display unit 100. In this state, when the user calls for a "forward" and/or a "backward" image, the photograph image taken before or after the image presently displayed is read out and displayed on the LCD monitor 102.

FIG. 2 is a perspective view of lens part 22 and elements thereof for a zooming operation of the lens part 22. The lens part 22 is at a withdrawn position in the body of the digital camera 10 when the digital camera 10 is switched OFF, i.e., in a non-photographing mode. The lens part 22 is at an extended position and in a ready state for photographing by protruding from the digital camera 10 when the power switch 112 is switched ON, i.e., the camera 10 is in a photographing mode. FIG. 2 shows a lens part 22 protruding from the digital camera 10 and the zooming operation is explained using this figure.

The lens part 22, having a series of lenses, is installed inside the lens mirror body 202 so as to be movable in the axial direction of an optical axis 250. The lens mirror body 202 includes a mirror body gear 220 at a peripheral portion thereof. The lens mirror body 202 includes a state indication part 206, parallel to the mirror body gear 220, and a cam slot 226 that is cut into the body 202 at an angle to the mirror body gear 220. The state indication part 206 includes a reflecting plate (described hereinafter with reference to FIG. 3). A photo reflector 204 faces the state indication part 206. The photo reflector 204 includes a light emission part and a light receiving part, and detects the reflecting ratio of the state indication part 206. A pin 228 that is fixed to the periphery of the lens part 22 is fit in the cam slot 226 of the lens mirror body 202 so as to be movable in a longitudinal direction thereof.

The mirror body gear 220 engages with a drive gear 222, and the drive gear 222 engages with a reduction gear 224. The reduction gear 224 is shaft-supported by an end of a shaft 240, and a pulse encoder generation part 210 is shaft-supported by the other end of the shaft 240. Thus, the pulse encoder generation part 210 rotates with the reduction gear 224. The pulse encoder generation part 210 includes blades 214 formed at regular intervals along a periphery thereof. The count part 212 counts the number of times the blades 214 pass in front of the count part 212.

A DC motor 256 is installed to the drive gear 222, and the DC motor 256 and the drive gear 222 rotate in the same direction. When the drive gear 222 rotates, the mirror body gear 220 and the reduction gear 224 are thereby driven. The DC motor 256 is rotatable in both the first rotary direction 280 and the second rotary direction 282.

The lens mirror body 202, which is integrated with the mirror body gear 220, rotates with the mirror body gear 220. The cam slot 226 is provided at an angle to the mirror body gear 220, and further the mirror body gear 220 rotates around the optical axis 250. Therefore, when the lens mirror body 202 rotates and the cam slot 226 moves, the pin 228 is driven in the axial direction of the optical axis 250. Accordingly, the lens part 22 moves in the axial direction of the optical axis 250. When the DC motor 256 rotates in the first rotary direction 280, the mirror body gear 220 rotates in the second rotary direction 282, and thus the lens part 22 moves in the first direction 290. Further, when the DC motor 256 rotates in the second rotary direction 282, the mirror body gear 220 rotates in the first rotary direction 280, and thus the lens part 22 moves in the second direction 292 towards the body the digital camera 10. In accordance with the above-mentioned operation, the lens part 22 can move in the first direction 290 and the second direction 292.

When the reduction gear 224 rotates, the pulse encoder generation part 210 is thereby driven. When the pulse encoder generation part 210 rotates, the blades 214 of the pulse encoder generation part 210 pass again and again in front of the count part 212. Namely, a pulse is generated for the count part 212. The count part 212 counts the number of pulses thereof. Since the rotation of the reduction gear 224 is associated with the rotation of the lens mirror body 202 (via the common drive gear 222), it is possible to determine the distance that the lens part 22 moves using the number of the pulses that are counted.

Figure 3:
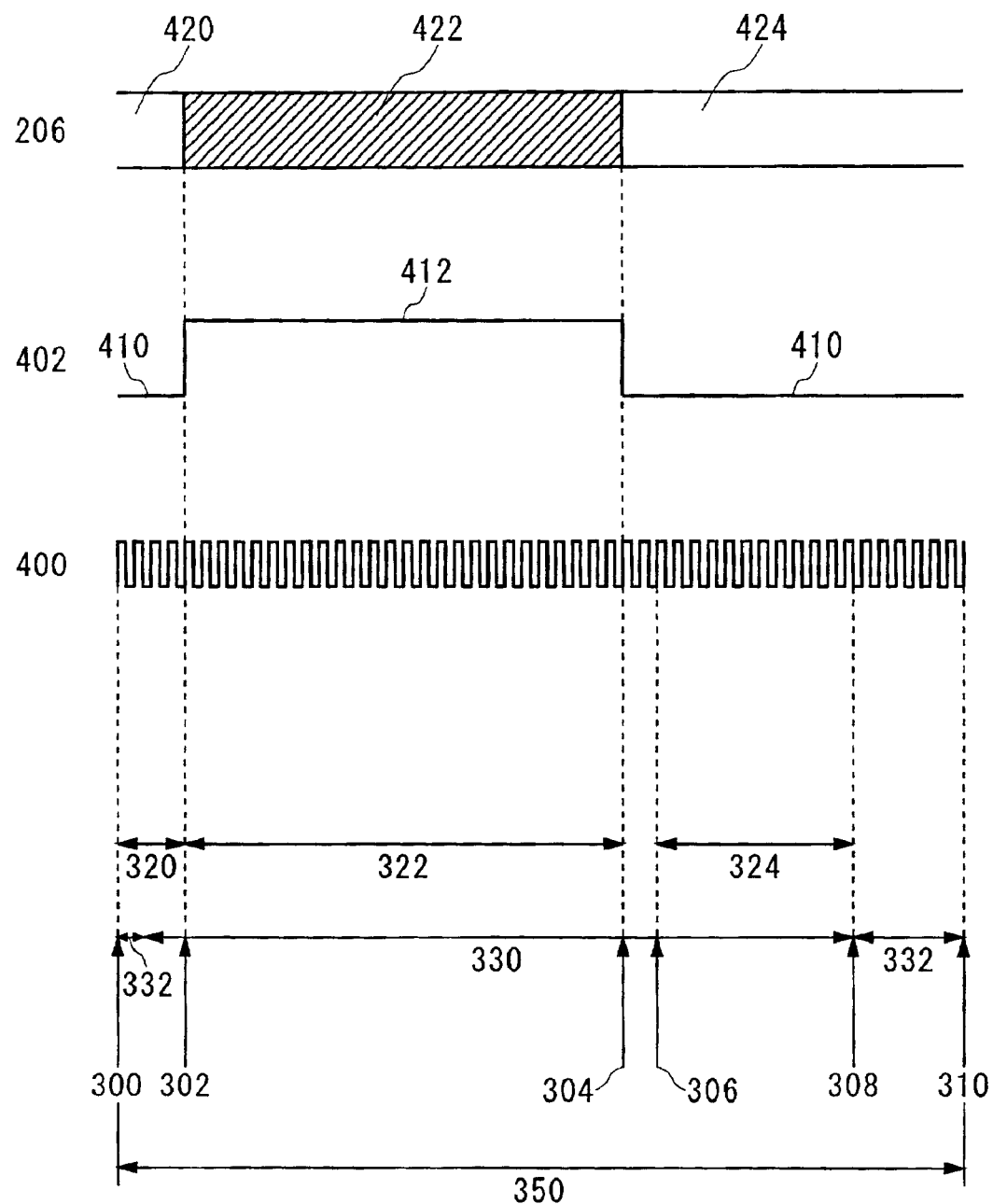
FIG. 3 illustrates a state indication part, a photo reflector output waveform, and a count part output waveform.

FIG. 3 illustrates a photo reflector output waveform 402 which the photo reflector 204 outputs when the lens part 22 moves, a count part output waveform 400 which the count part 212 outputs, and the state indication part 206. The lens part 22 is movable in the moving range 350. In the moving range 350 of the lens part 22, there are provided, relative to the body of the digital camera 10, a shortest position 300, a withdrawn position 302, a photographing preparation position 304, a wide position 306, a telephoto position 308, and a longest position 310.

The withdrawn position 302 is a position where the lens part 22 stops when the digital camera 10 is not being used or is in a non-photographing mode, the photographing preparation position 304 is a position where the lens part 22 stops at the preparation stage of photographing when the electric power is supplied and/or the non-photographing mode is changed to the photographing mode, for example. The shortest position 300 and the longest position 310 are extreme positions for movement of the lens part 22, and a wall is provided here. Movable areas 332, which are an area from the telephoto position 308 to the longest position 310 and an area from the shortest position 300 to a position in the vicinity of the shortest position 300, are areas where the lens part 22 does not move in a normal usage state. The moving range 350 of the lens part 22 includes a mobile area 330, where the lens part 22 moves from a vicinity of the withdrawn position 302 to the telephoto position 308 in the normal usage state, and the mobile areas 332, where the lens part 22 does not move in the normal usage state.

The mobile area 330 includes a stop area 320 from the shortest position 300 to the withdrawn position 302, where the digital camera 10 stops and is positioned, an initial mobile area 322 from the withdrawn position 302 to the photographing preparation position 304, where the digital camera 10 moves at the preparation stage of photographing, and a photographing area 324 from the wide position 306 to the telephoto position 308, where the lens part 22 moves when the actual photograph is taken. The width of the movable area 332, which is adjacent to the telephoto position 308, is longer than the width of the stop area 320, and the width of the mobile area 330 is longer than the width of the photographing area 324.

The state indication part 206 includes a reflecting plate having a first area 420 with a first reflecting part 410 for providing a first reflecting ratio to the photo reflector 204, a second area 422 having a second reflecting part 412 for providing a higher reflecting ratio than the first reflecting ratio to the photo reflector 204, and a third area 424 having the first reflecting part 410, arranged in the order thereof. The photo reflector 204 moves relative to the state indication part 206 and detects the reflecting ratio of the third area 424, starting from the first area 420 of the state indication part 206, and outputs the photo reflector output waveform 402.

The withdrawn position 302 is at the boundary between the first area 420 and the second area 422, and the photographing preparation position 304 is at the boundary between the second area 422 and the third area 424. Thus, it is possible to detect that the lens part 22 is positioned in the withdrawn position 302 and the photographing preparation position 304 by identifying a change of the photo reflector output waveform 402.

When the lens part 22 moves, the count part 212 outputs the count part output waveform 400. Therefore, even if the lens part 22 is at a position where the state indication part 206 does not change, it is possible to determine where the photographing lens part 22 is positioned using the count number which the count part 212 keeps or monitors.

In this, a detection part 232 (see FIG. 4) monitors the withdrawn position 302 and the photographing preparation position 304 in a precise manner. Furthermore, the count part 212 monitors a relative position thereof of the lens part 22, in which the withdrawn position 302 and the photographing preparation position 304 are defined as respective reference positions. In this way, it is possible to identify the precise position of the lens part 22 effectively using two detection means each of which has a different relative level of precision.

Since, as shown in FIG. 3, the photographing preparation position 304 is outside the photographing area 324, it is possible to avoid deterioration by backlash of the precision of detecting the position of the lens part 22. Further, preferably the photographing preparation position 304 is located at the side of the wide position 306 (as shown in FIG. 3) since the movable area 332, at the other side, is an area where the lens part 22 is not moved in normal usage. In this, for a position of the lens part 22 where the state indication part 206 does not indicate a change of the state, it is possible to determine the precise position of the lens part 22 in the photographing area 324 using the count number generated by the count part 212.

Accordingly, the state indication part 206 provides precise detection of the withdrawn position 302 and the photographing preparation position 304, and of a relative position of the lens part 22 where the withdrawn position 302 and the photographing preparation position 304, which are detected by the detection part 232, are respective reference positions. In this way, it is possible to effectively recognize the precise position of the lens part 22 using two detection means.

Figure 4:
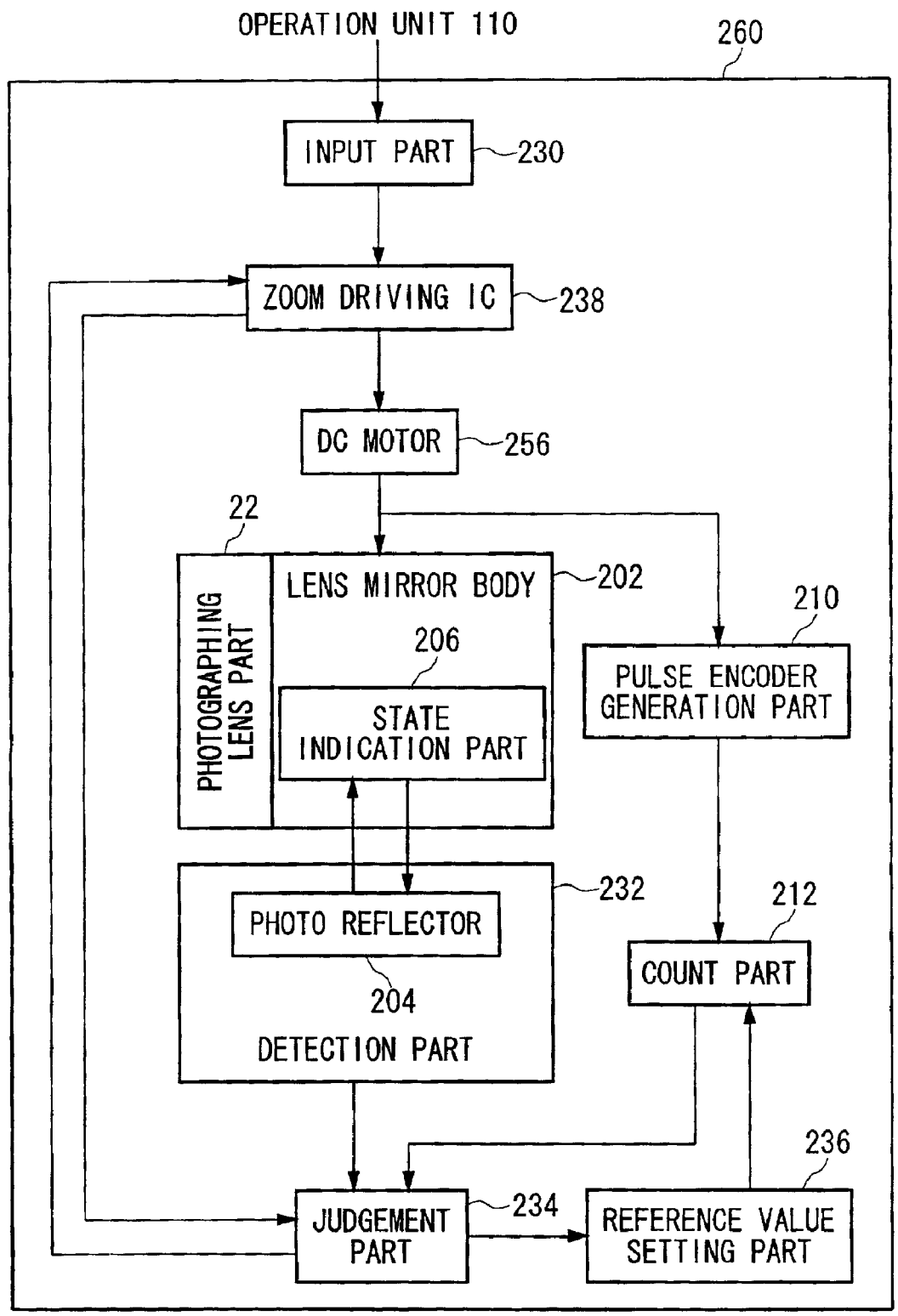
FIG. 4 illustrates schematically the functioning of a zoom part.

FIG. 4 illustrates schematically the functioning of a zoom part 260. The zoom part 260 can have a moving mechanism, which is described in the foregoing using FIG. 2, by linking programs loaded or stored in the nonvolatile memory 66 or the main memory 68, the main CPU 62, and the image control unit 40 of FIG. 1. In case the main CPU 62 has an internal memory, it is possible to make and use various functions as firmware by storing the required program in the memory thereof. In FIG. 4, though respective functions with regards to the zooming operation are described simultaneously as one system, in actuality the various functions need not be in one system. In the digital camera 10, considerable freedom is provided in designing the operation of the zoom part 260.

The zoom part 260 includes an input part 230, a zoom driving IC 238, the DC motor 256, the photographing lens part 22, the lens mirror body 202, the detection part 232, an identification or judgement part 234, the pulse encoder generation part 210, the count part 212, and a reference value setting part 236.

The input part 230 inputs information from the operation unit 110, which indicates ON/OFF of the power supply or start/stop of a zooming operation and the adjustment of zooming while photographing. The input part 230 sends indicating information to the zoom driving IC 238, which indicates the direction and the speed of rotating and start/stop of rotating of the DC motor 256 based on input information. The zoom driving IC 238 also sends direction information to the identification part 234, which indicates the present direction of rotation. The DC motor 256 drives the lens mirror body 202 and the pulse encoder generation part 210. Further, the DC motor 256 starts/stops rotation based on indication information, switches the speed of rotating, and/or switches the direction of rotating between the first rotary direction 280 and the second rotary direction 282.

The lens mirror body 202 rotates by the driving power of the DC motor 256, and the lens part 22 is driven by the lens mirror body 202 and moved to the first direction 290 and the second direction 292. The lens mirror body 202 includes the state indication part 206. The detection part 232 includes the photo reflector 204. The photo reflector 204 detects the reflecting ratio of the state indication part 206. The detection part 232 sends reflecting part information to the identification part 234, which indicates which reflecting part of the first reflecting part 410 and the second reflecting part 412 is detected based on the reflecting ratio which the photo reflector 204 detects.

The pulse encoder generation part 210 is rotated by the driving power of the DC motor 256, and generates a pulse to the count part 212. The count part 212 counts the number of pulses that are generated, and then sends the number of pulses that are counted to the identification part 234.

The identification part 234 identifies the current position of the lens part 22 based on direction information received from the zoom driving IC 238, reflecting part information received from the detection part 232, and the number of counts received from the count part 212. Further, the identification part 234 sends indication information to the reference value setting part 236 based on the direction information, the reflecting part information, and the number of counts. Accordingly, it is possible to control the movement of the lens part 22. The identification part 234 stores in advance the number of counts that should be counted when the photographing lens part 22 is positioned at the wide position 306 and the telephoto position 308.

The reference value setting part 236 stores the number of counts as a reference value in advance, which the count part 212 should maintain, and sets the reference value in the count part 212 as the number of counts which the count part 212 should maintain when reference value setting part 236 receives the start signal. The reference value is set in the count part 212 in this way, thus the count part 212 is capable of counting the number of pulses using the boundary position of the reflecting part as the reference. Therefore, even if the number of counts is changed while moving with great speed, the count part 212 is capable of counting the number of counts precisely since the number of counts is set when the states are changed.

Figure 5:
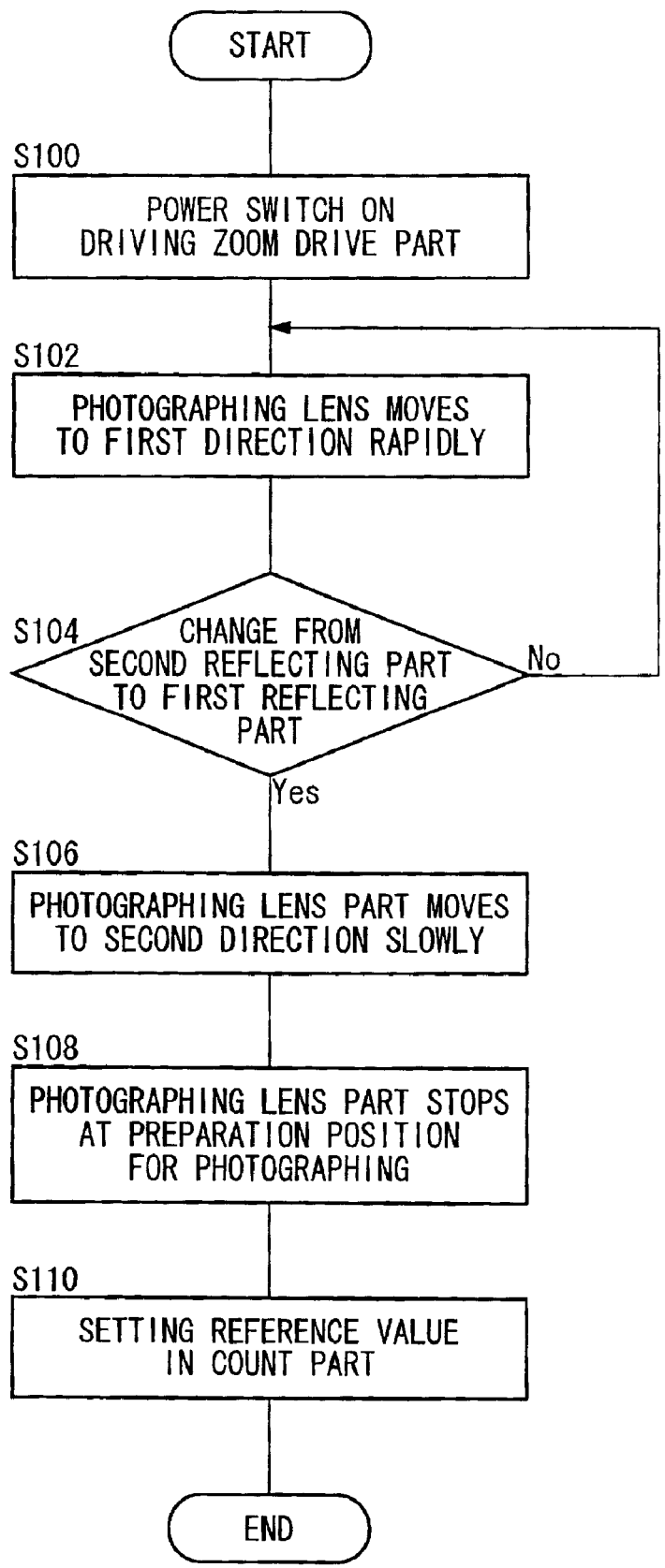

FIG. 5 is a flowchart of the process of operating the zoom part 260 when the electric power is switched on. The power switch 112 of the digital camera 10 is switched on, and preparation of the zoom part 260 for photographing is started. The input part 230 sends indication information to the zoom driving IC 238 when information indicating the power switch 112 has been switched on is input, enabling the DC motor 256 to rotate at high speed in the first rotary direction 280 (S100). Next, the lens part 22 moves with great speed in the first direction 290 driven by the DC motor 256 (S102). Next, the detection part 232 detects the reflecting ratio of the state indication part 206, and the lens part 22 moves towards the first direction 290 until the reflecting ratio of the second reflecting part 412 changes to the ratio of the first reflecting part 410 (S104). In this way, the lens part 22 moves in the initial mobile area 322 with great speed, and it is possible to turn it to a ready condition in preparation for a photograph immediately after the power switch 112 is switched on.

In the case of changing from the second reflecting part 412 to the first reflecting part 410, the identification part 234 recognizes in which direction of the first rotary direction 280 and the second rotary direction 282 the DC motor 256 moves. The identification part 234 then identifies which area of the first area 420 and the third area 424 the detection part 232 has detected based on the recognized result.

When the detection part 232 has detected the change of the reflecting ratio (S104), the lens part 22 stops moving, subsequently returns to the position where the reflecting ratio has changed at low speed (S106), and then stops at the photographing preparation position 304. Next, the reference value setting part 236 sets the reference value (S110) in the count part 212. Here, the operation of the zoom part 260 in preparation of photographing, when the power switch 112 is switched on, terminates.

In this way, it is possible to accurately and rapidly control the position of the lens part 22 by changing the driving speed of the DC motor 256 to a low or a high speed. Further, the detection part 232 determines the position of the lens part 22 using the change of the reflecting ratio of the state indication part 206, and thus the lens part 22 is capable of stopping at a precise position.

Figure 6:
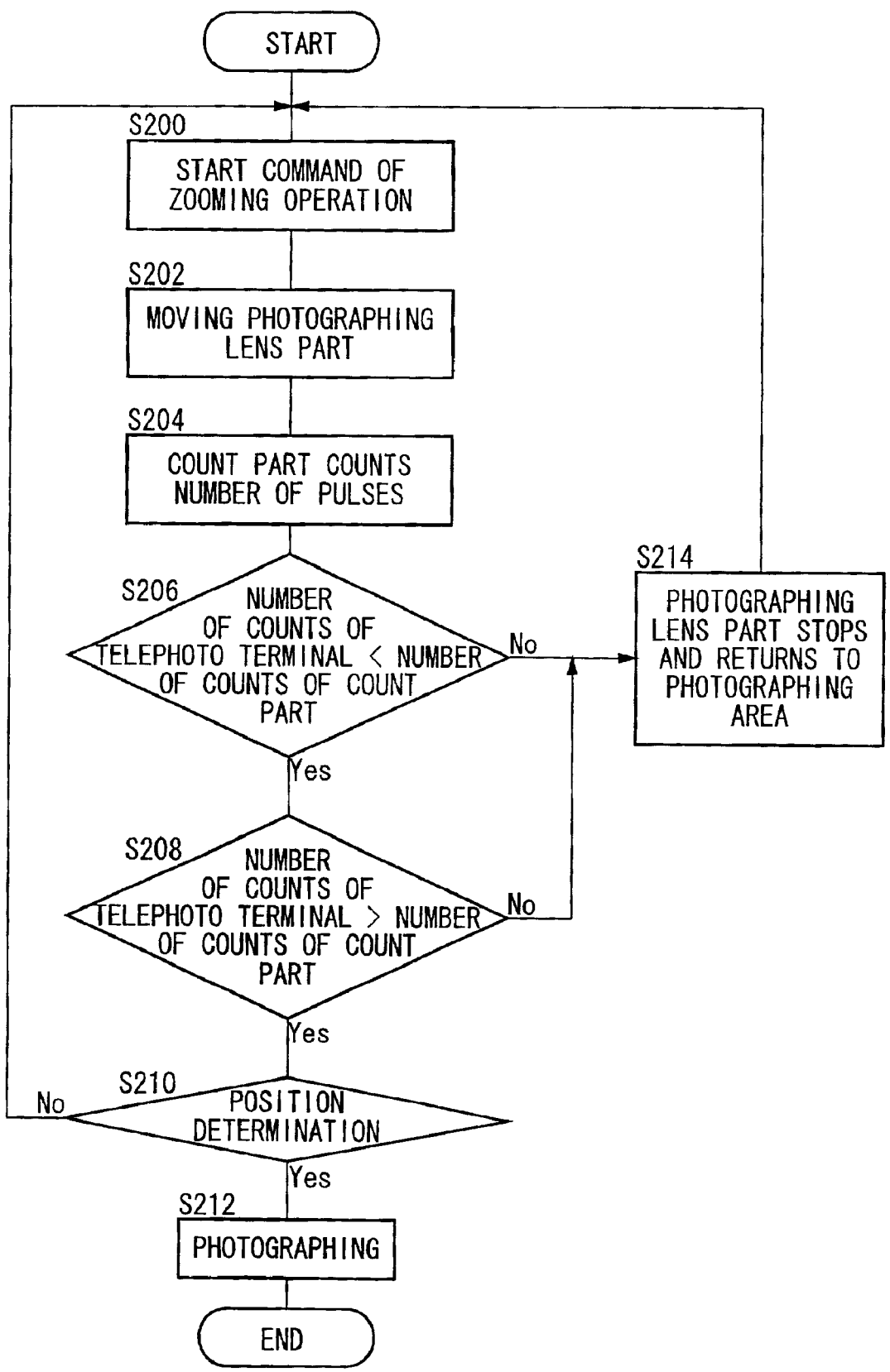
FIG. 6 is a flowchart of the process of operating the zoom part when the zooming operation is performed.

FIG. 6 is a flowchart of the process of operating the zoom part 260 when the zooming operation is performed. A zooming operation start command is input to the input part 230 by way of the operation unit 110. The input part 230 sends indication information to the zoom driving IC 238 (S200) using the input command. Next, the zoom driving IC 238 drives the DC motor 256 using the indication information, and then moves the lens part 22 (S202). Next, the count part 212 counts the pulses that are generated (S204). At this time, if the number of pulses which the count part 212 counts is greater than the number of pulses which the count part 212 should count when the lens part 22 is positioned at the wide position 306 (S206) and is smaller than the number of pulses which the count part 212 should count when the lens part 22 is positioned at the telephoto position 308 (S208), the operation proceeds to S210. Next, when the lens part 22 stops at the position that the user desires (S210), the photograph is taken (S212). Until the required position is determined at S210, the operation is repeated from the step of S200 to the step of S210 in accordance with the input by way of the operation unit 110.

At S206, if the number of pulses which the count part 212 counts is smaller than the number of pulses which the count part 212 should count when the lens part 22 is positioned at the wide position 306, the lens part 22 stops moving and returns to the photographing area 324 (S214). Further, at S208, if the number of pulses which the count part 212 counts is larger than the number of pulses which the count part 212 should count when the lens part 22 is positioned at the telephoto position 308, the lens part 22 stops moving and returns to the photographing area 324 (S214). At S212, the process terminates when photographing terminates.

Figure 7:
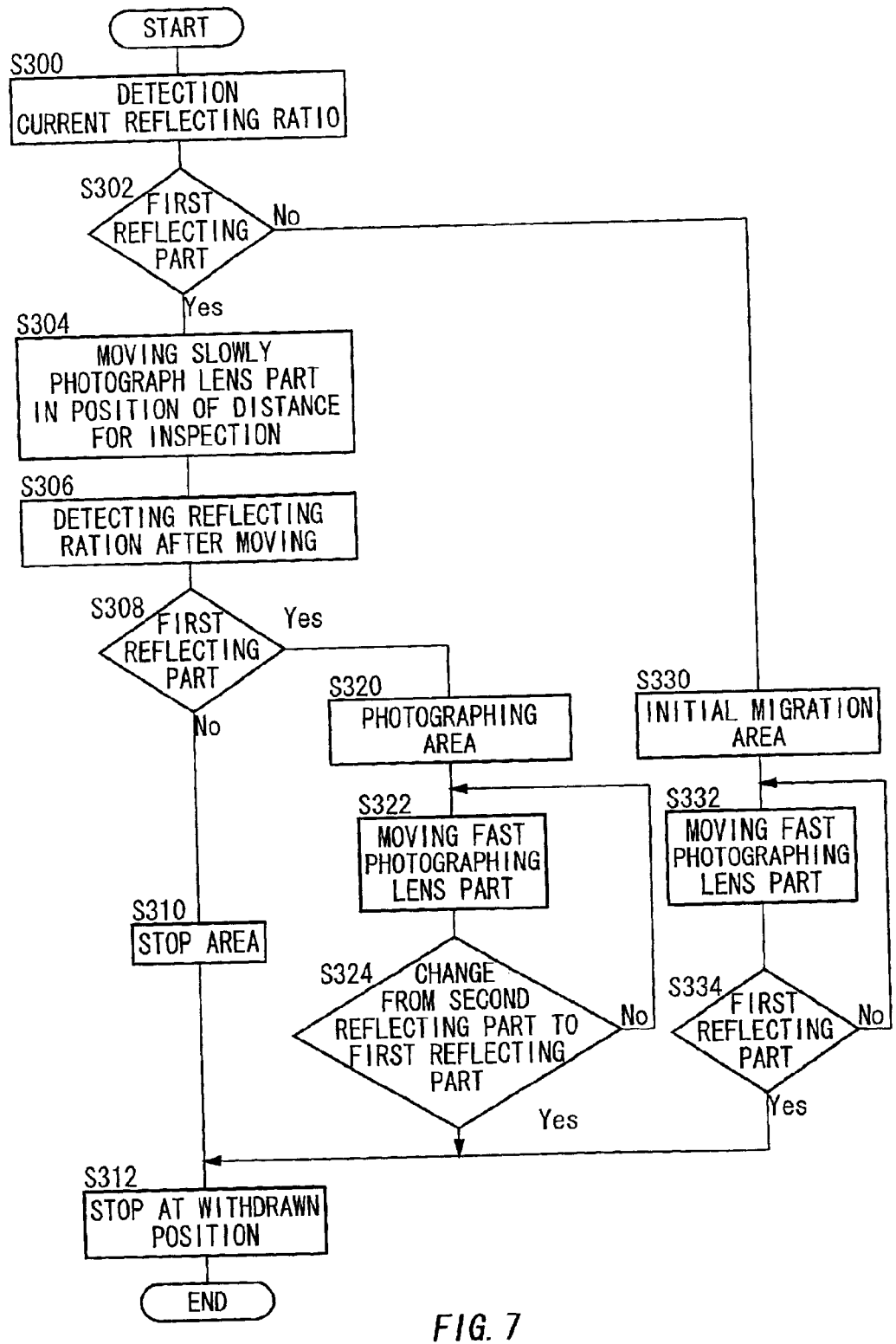
FIG. 7 is a flowchart of the process of operating the zoom part when a power switch is switched on after the electric supply is shut off by an abnormal operation.

FIG. 7 is a flowchart of the process of operating the zoom part 260 when the power switch 112 is switched on after the electric supply is shut off by an abnormal operation, such as in the case of the battery being discharged or the battery being removed at the time of photographing. In a case that the identification part 234 memorizes the position of the lens part 22 just before the electric supply to the identification part 234 is switched on, when the electric supply is switched on again after the electric power is switched off by the abnormal operation, the preparation for photographing is performed as usual by returning to the withdrawn position 302 from the position thereof. FIG. 7 shows the case of the zoom part 260 when the identification part 234 does not memorize the position of the photographing lens part 22, just before the electric power is switched on again, when the electric power is switched on again.

The zoom part 260 initiates the operation, and the detection part 232 detects the present reflecting ratio (S300). When the reflecting ratio of the first reflecting part 410 is detected (S302), the identification part 234 sends indication information to the zoom driving IC 238, which indicates that the lens part 22 is to be moved to an inspecting position in the first direction 290, corresponding to: (the width of the stop area 320+1 count). The zoom driving IC 238 drives the DC motor 256, using the indication information, and moves the lens part 22 at low speed to the inspecting position in the first direction 290. At this time, the identification part 234 monitors the distance of movement using the number of counts which the count part 212 should count (S304). Next, the detection part 232 detects the reflecting ratio of the state indication part 206 after the photographing lens part 22 has moved (S306).

Next, if the reflecting ratio of the first reflecting part 410 is not detected, namely the reflecting ratio of the second reflecting part 412 is detected (S310), it is determined that the lens part 22 was positioned in the stop area 320 (S310) when the power was abnormally terminated. At this moment, the lens part 22 is positioned near the stop area 320 in the initial mobile area 322. Next, the lens part 22 moves in the second direction 292 at low speed. That is to say, the lens part 22 stops at the withdrawn position 302 (S312).

At S308, in the case that the reflecting ratio of the first reflecting part 410 is detected, it is determined that the lens part 22 was positioned in the photographing area 324 when the electric power supply was switched off (S320). At this moment, the lens part 22 is positioned in the photographing area 324 or the movable area 332. Thus, the lens part 22 moves to the second direction 292 at high speed (S322). Until the detection part 232 detects the reflecting ratio of the second area 422 and further detects the reflecting ratio of the first area 420, the photographing lens part 22 continues to move (S324). Next, when the detection part 232 detects the reflecting ratio of the first area 420 after detecting the reflecting ratio of the second area 422, the photographing lens part 22 moves in the first direction 290 at low speed and stops at the withdrawn position 302 (S312).

Further, at S302, when the reflecting ratio of the second reflecting part 412 is detected, it is determined that the lens part 22 was positioned in the initial mobile area 322 when the electric power supply was abnormally switched off (S330). Next, the lens part 22 moves in the second direction 292 at high speed (S332). The lens part 22 continues to move until the detection part 232 detects the reflecting ratio of the first area 420 (S334). When the detection part 232 detects the reflecting ratio of the first area 420, the lens part 22 returns to the withdrawn position 302 at low speed, and stops at the withdrawn position 302 (S312). Thus, the operation of the zoom part 260 terminates.

Since the width of the initial mobile area 322 is greater than the inspecting distance as defined above, the lens part 22 does not reach the longest position 310 even if the lens part 22 is moved in the first direction 290. Therefore, when it is not possible to decide whether or not the lens part 22 is positioned in either of the stop area 320 and the photographing area 324, if the lens part 22 is moved to the inspecting position through the distance for inspection in the first direction 290, it is possible to determine which of the stop area 320 and the photographing area 324 the lens part 22 was positioned in.

Figure 8:
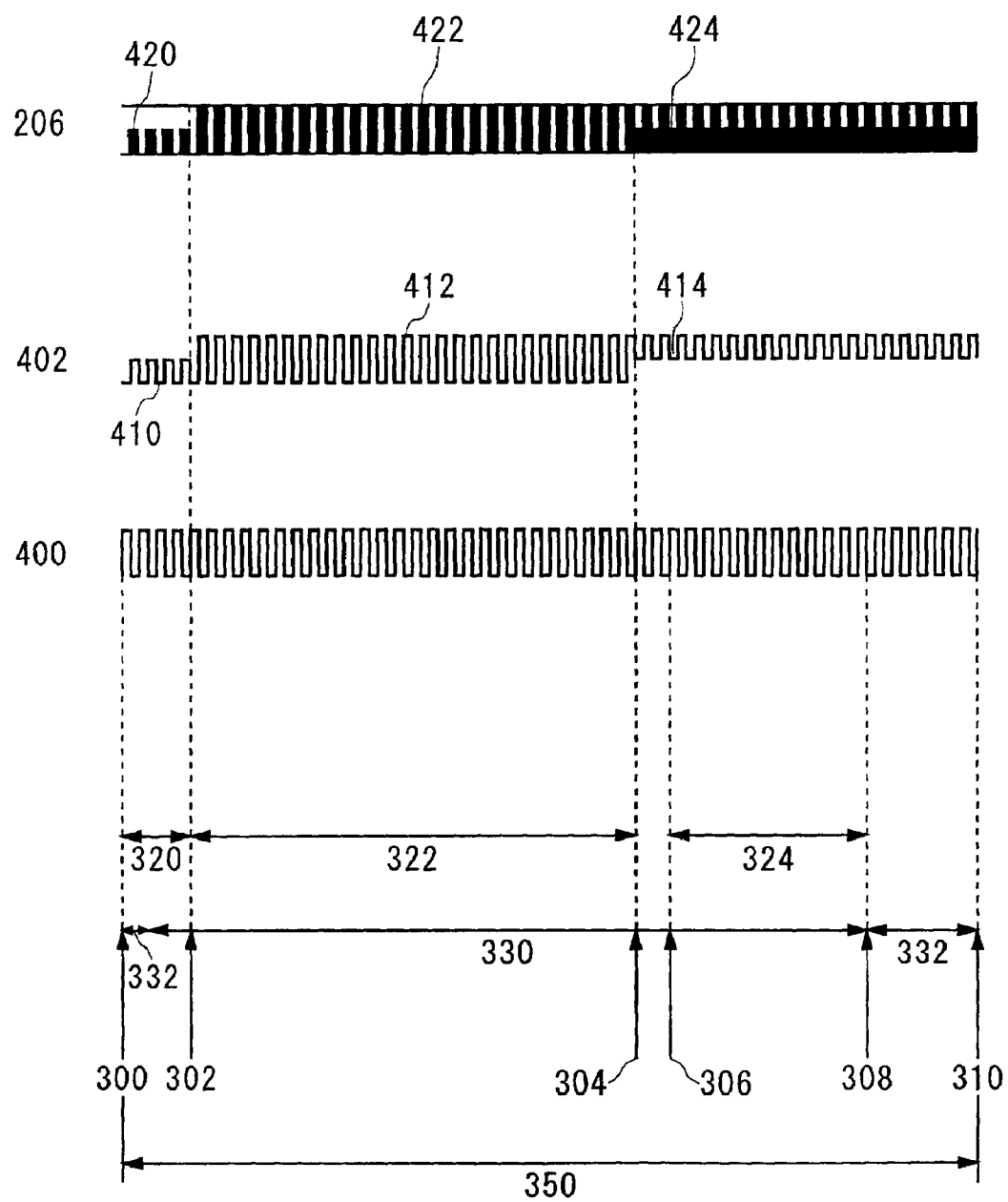
FIG. 8 illustrates the state indication part, the photo reflector output waveform, and the count part output waveform of a second preferred embodiment.

FIG. 8 illustrates the state indication part 206, the photo reflector output waveform 402, and the count part output waveform 400 of a second preferred embodiment. The state indication part 206 of a preferred embodiment thereof includes the first area 420, the second area 422, and the third area 424. In these areas, the first reflecting part 410, the second reflecting part 412, and the third reflecting ratio 414, each of which has a different reflecting ratio, are provided repeatedly at even intervals. In the first area 420, the first reflecting part 410 and the third reflecting ratio 414 are provided repeatedly with regularity. In the second area 422, the first reflecting part 410 and the second reflecting part 412 are provided repeatedly with regularity. In the third area 424, the second reflecting part 412 and the third reflecting ratio 414 are provided repeatedly with regularity.

The detection part 232 of the present invention detects the photo reflector output waveform 402. In such a case, the detection part 232 detects the position, where the lens part 22 is positioned, among the first area 420, the second area 422, and the third area 424 using sequential two reflection ratios that are output from the photo reflector 204. The detection part 232 sends area information, which indicates the area where the lens part 22 is positioned, to the identification part 234. Thus, it is possible to recognize the first area 420, second area 422, and third area 424.

In this embodiment, the zoom part 260 does not include the pulse encoder generation part 210. The count part 212 counts the number of changes of the reflecting ratios which the photo reflector 204 has detected. With regard to this point, a second preferred embodiment thereof is not the same as a first preferred embodiment. The count part 212 counts the number of changes of the reflecting ratios which the detection part 232 has detected, instead of counting pulses which the pulse encoder generation part 210 has generated as in a first embodiment. In this way, the count part 212 indicates the count part output waveform 400 in the same manner as the count part output waveform 400 shown in FIG. 3 of a first preferred embodiment by counting the number of changes of the reflecting ratios of the detection part 232. Therefore, it is possible for the count part 212 to recognize the position of the lens part 22 by counting the number of changes of the reflecting ratios of the detection part 232 in the same manner as a first preferred embodiment.

Except for the foregoing, the structure and the process of operating the zoom part 260 are the same as the structure and the operation which are explained using FIGS. 1 to 7, thus an explanation is omitted here.

Thus, though the present invention is explained using preferred embodiments, the technical scope of the present invention is not limited to the scope of preferred embodiments explained in the foregoing. It is possible to add various modifications or improvements to the preferred embodiments described in the foregoing. After reading and understanding the foregoing description of preferred embodiments of the invention, in conjunction with the illustrative drawings, it will be appreciated that several distinct advantages of the subject lens moving mechanism and method thereof are obtained.

In this, though the pulse encoder generation part 210 of a preferred embodiment of the present invention has the blades 214, it may be possible for the pulse encoder generation part 210 to be formed in such a way that a transparent part and an opaque part are arranged repeatedly with regularity. In such a case, the count part 212 counts the number of times they repeat.

Further, though the withdrawn position 302 and the photographing preparation position 304 of the preferred embodiment are formed at the boundary of the first area 420 and the second area 422, respectively, it may be possible for the withdrawn position 302 and the photographing preparation position 304 to be formed at a vicinity of the boundary of the first area 420 and the second area 422 and at a vicinity of the boundary of the second area 422 and the third area 424, respectively.

Furthermore, though the detection part 232 of the preferred embodiment is fixed at the body of the digital camera 10 and the state indication part 206 moves with the lens mirror body 202, it may be possible for the detection part 232 to be a moving member and for the state indication part 206 to be a fixed member.

Moreover, though the detection part 232 of a preferred embodiment detects the state, it maybe possible for the detection part 232 to be an edge detecting part for detecting only a change of the state. In this case, the edge detecting part detects a build-up edge, where the reflecting ratios detected by the photo reflector 204 change from the first reflecting part 410 to the second reflecting part 412, and a build-down edge, where the reflecting ratios change from the second reflecting part 412 to the first reflecting part 410. Further, the edge detecting part sends edge detection information, which indicates that the build-up and the build-down are detected, to the reduction gear 224. In such a case, it is possible to recognize the area which the identification part 234 detects at the present time using edge detection information, the number of counts, and direction information.

Next, in the state indication part 206 of a second preferred embodiment, though two reflecting parts, each of which has a different reflecting ratio to each other, are formed repeatedly with regular intervals, the reflecting parts, each of which has a different reflecting ratio to each other, may be formed repeatedly with irregular intervals, and furthermore three different reflecting parts may be formed repeatedly with regular intervals. In this way, it is important that the count part 212 count the number of changes of the reflecting ratios and the count part 212 recognize the distance of moving using the number of counts which the count part 212 counts, and thus the freedom available in arranging the reflecting part in the state indication part 206 is high.

In describing the invention, reference has been made to preferred embodiments and illustrative advantages of the invention. Those skilled in the art, however, and familiar with the instant disclosure of the subject invention, may recognize additions, deletions, modifications, substitutions and other changes that fall within the purview of the subject invention.

What is claimed is:

1. A lens moving mechanism for controlling and monitoring movement of an imaging lens, said moving mechanism comprising:
   (a) a detection part for detecting a plurality of reflectivities;
   (b) a state indication part having arranged in order thereof first, second and third areas, said first area, including a first reflecting part and a third reflecting part, each repeatedly provided for indicating a first state to said detection part, said second area, including said first reflecting part and a second reflecting part, each repeatedly provided for indicating a second state to said detection part, and said third area, including said second reflecting part and said third reflecting part, each repeatedly provided for indicating the first state to said detection part;
   (c) a drive part for moving said detection part, relative to said state indication part, in a direction thereof; and
   (d) an identification part for identifying a position of the lens based upon a change of reflectivity in one scan of moving said detection part within a width of said state indication part along a sequence of indication of said first area and said second area and said third area of said state indication part detected by said detection part.

2. A lens moving mechanism according to claim 1, further comprising a count part for determining a count based upon said movement by said drive part;
   said identification part identifying said position of the lens based upon one or more of said sequence of indication, said count by said count part, and said direction of movement by said drive part.

3. A lens moving mechanism according to claim 1, wherein:
   said drive part moves said detection part, relative to said state indication part, from said first area in a direction toward said third area when said state indication part indicates the first state to said detection part; and
   upon movement of said detection part to a position of predetermined distance, said identification part identifies that (a) said detection part detected the first area before moving said predetermined distance when said detection part detects the second state and (b) said detection part detected the third area before moving said predetermined distance when said detection part does not detect the second state.

4. A moving mechanism, comprising:
   (a) a detection part for detecting one of a first state and a second state;
   (b) a state indication part having, arranged in order thereof, a first area, including a first reflecting part and a third reflecting part, each repeatedly provided for indicating the first state to said detection part, a second area, including said first reflecting part and a second reflecting part, each repeatedly provided for indicating the second state to said detection part, and a third area, including said second reflecting part and said third reflecting part, each repeatedly provided for indicating the first state to said detection part;

(c) a drive part for moving said detection part in a relative manner to said state indication part; and (d) an identification part for identifying a position of the lens based upon a change of reflectivity in one scan of moving said detection part within a width of said state indication part along a sequence of indication of said first area and said second area and said third area of said state indication part detected by said detection part;

wherein an area of movement in which said detection part moves in a normal usage state includes the first area, the second area, and a portion of the third area; a movable area, in which said detection part is movable but does not move in said normal usage state, is provided outside said portion of the third area included in said movement area; and the width of the movable area is more than the width of the first area.

5. The moving mechanism according to claim 4, wherein:

when said state indication part indicates the first state to said detection part said drive part moves said detection part, relative to said state indication part, in a direction of the third area from the first area, and upon movement of said detection part to a position of predetermined distance, said identification part identifies that (a) said detection part detected the first area before moving the predetermined distance when said detection part detects the second state and (b) said detection part detected the third area before moving the predetermined distance when said detection part does not detect the second state.

6. The moving mechanism according to claim 5, wherein:

said first, second, and third reflecting parts each have two or more different reflecting ratios arranged repeatedly in a direction said detection part moves;

said state indication part includes a count part for counting a number of times the two or more different reflecting ratios repeat when said detection part moves; and said identification part recognizes the predetermined distance using the number counted by said count part.

7. A lens mirror body with a moving mechanism for moving a lens part in a first, second, and third areas, comprising:

(a) a drive part for moving said lens;

(b) a state indication part having, arranged in order thereof, a first area, including a first reflecting part and a third reflecting part, each repeatedly provided for indicating a first state, a second area, including said first reflecting part and a second reflecting part, each repeatedly provided for indicating a second state, and a third area, including said second reflecting part and said third reflecting part, each repeatedly provided for indicating the first state, said state indication part indicating the first state when said lens part is positioned in the first and third areas and indicating the second state when said lens part is positioned in the second area; and (c) an identification part for identifying a position of the lens based upon a change of reflectivity in one scan of moving said detection part within a width of said state indication part along a sequence of indication of said first area and said second area and said third area of said state indication part detected by said detection part;

wherein an area of movement of said lens part during a normal usage state includes the first area, the second area, and a portion of the third area; a movable area where said lens part is movable but said lens part does not move while photographing is provided in the third area; and the width of the movable area is more than the width of the first area.

8. In combination, an image device and a movable lens part, comprising:

(a) a detection part for detecting a plurality of reflectivities;

(b) a state indication part, having arranged in order thereof, a first area, including a first reflecting part and a third reflecting part, each repeatedly provided for indicating the first state to the detection part, a second area, including said first reflecting part and a second reflecting part, each repeatedly provided for indicating the second state to the detection part, and a third area, including said second reflecting part and said third reflecting part, each repeatedly provided for indicating the first state to the detection part;

(c) a drive part for moving said detection part, relative to said state indication part, in two or more areas among the first, second, and third areas and driving said lens part therewith; and (d) an identification part for identifying a position of the lens based upon a change of reflectivity in one scan of moving said detection part within a width of said state indication part along a sequence of indication of said first area and said second area and said third area of said state indication part detected by said detection part.

9. The combination according to claim 8, wherein:

said identification part recognizes a moving direction between a movement in a direction of the third area from the first area and a reverse direction thereto, when the state changes from the second state to the first state, and identifies an area which said detection part detects based on a result of said recognition.

10. The combination according to claim 9, wherein said drive part moves said detection part, relative to said state indication part, in a direction of the third area from the first area, when said state indication part indicates the first state to said detection part, and when said detection part has moved to a position of predetermined distance, said identification part identifies that (a) said detection part detected the first area before moving the predetermined distance when said detection part detects the second state and (b) said detection part detected the third area before moving the predetermined distance when said detection part does not detect the second state.

11. The combination according to claim 10, wherein:

said first, second, and third reflecting parts each have two or more different reflecting ratios arranged repeatedly in a direction said detection part moves;

said state indication part includes a count part for counting a number of times the two or more different reflecting ratios repeat when said detection part moves; and said identification part recognizes the predetermined distance using the number counted by said count part.

12. The combination according to claim 11, further comprising:
- a reference value setting part for setting, in advance, a reference value in said count part at the time said detection part moves and said detection part changes from the first state to the second state and from the second state to the first state; and
- for setting the reference value as a number counted by said count part when a state which said detection part detects changes.

13. The combination according to claim 12, wherein
said detection part returns to a position in which the state changes at a lower speed than a moving speed towards the predetermined distance if said detection part changes from the first state to the second state and from the second state to the first state when said lens part moves in a predetermined direction, and said count part starts to count at the time said detection part returns to the position in which the state changes.

14. The combination according to claim 8, wherein an area of movement of said lens part in a normal usage state includes the first area, the second area, and a portion of the third area; a movable area where said lens part is capable of moving but said lens part does not move while photographing is provided in the third area; and a width of the movable area is more than a width of the first area.

15. The combination according to claim 8, wherein a withdrawn position of said lens part is located at one of a boundary position between the first area and the second area and a vicinity thereof, and
- a photographing preparation position of said lens part in preparation for photographing is located at one of a boundary position between the second area and the third area and a vicinity thereof.

16. An image device having a movable lens part, comprising:
- a detection part for detecting a plurality of reflectivities;
- a state indication part, having arranged in order thereof, a first area, including a first reflecting part and a third reflecting part, each repeatedly provided for indicating the first state to the detection part, a second area, including said first reflecting part and a second reflecting part, each repeatedly provided for indicating the second state to the detection part, and a third area, including said second reflecting part and said third reflecting part, each repeatedly provided for indicating the first state to the detection part;
- a drive part for moving said detection part, relative to said state indication part, between the first area and the third area and driving said lens part therewith; and
- an identification part for identifying a position of the lens based upon a change of reflectivity in one scan of moving said detection part within a width of said state indication part along a sequence of indication of said first area and said second area and said third area of said state indication part detected by said detection part.

17. A position detection method for detecting a position of a movable lens part in a lens minor body, comprising the steps of:
(a) moving the lens part in two or more areas among a first area, including a first reflecting part and a third reflecting part, each repeatedly provided for indicating a first state, a second area, including a first reflecting part and a second reflecting part, each repeatedly provided for indicating a second state, and a third area, including a second reflecting part and a third reflecting part, each repeatedly provided for indicating the first state;

(b) detecting the first state and the second state during said moving step; and when the second state is changed to the first state in said detecting step;

(c) recognizing a moving direction of said lens between a direction towards the third area from the first area and a reverse direction thereto; and (d) identifying an area detected prior to said moving step based on a result of said recognizing step.

18. A method of identifying a position of a movable lens part in an image device, comprising:
- preparing a first area having a first reflecting part, a second area having a second reflecting part, and a third area having said first reflecting part in order, respectively;
- detecting a first reflecting ratio when the moveable lens part is at a start position;
- moving a detection part relative to the moveable lens part in a direction from said first area to said third area when said detected reflecting ratio is of said first reflecting part;
- detecting a second reflecting ratio after moving the detection part, wherein said moving of the detection part is one scan within a width of an area constituted by the first, second, and third areas; and
- determining that the detection part was located at said third area in said start position of the moveable lens, prior to being moved, when said second reflecting ratio remains substantially constant.

19. A method of identifying a position of a movable lens part in an image device as claimed in claim 18, further comprising:
- determining that the movable lens part was located at said first area in said start position, prior to being moved, when said second reflecting ratio changes from said first reflecting part to said second reflecting part.

20. A method of identifying a position of a movable lens part in an image device as claimed in claim 18, after determining of the location of the detection part, further comprising: identifying where said start position of the movable lens was located, prior to being moved.

21. A method of identifying a position of a movable lens part in an image device as claimed in claim 18, wherein each of reflecting ratio of the first, second, and third reflecting parts in the first, second, and third areas is respectively constant along a perpendicular direction of the width of the area constituted by the first, second, and third areas.

22. A method of identifying a position of a movable lens part in an image device as claimed in claim 18, wherein said detection part includes a single sensor and said sensor detects each of reflecting ratio of the first, second, and third reflecting part in the first, second, and third areas.

* * * * *